United States Patent
Huang et al.

(10) Patent No.: US 7,725,989 B2
(45) Date of Patent: Jun. 1, 2010

(54) DUAL-AXIS HINGE MECHANISM

(75) Inventors: Lian-Cheng Huang, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/267,716

(22) Filed: Nov. 10, 2008

(65) Prior Publication Data

US 2010/0011539 A1    Jan. 21, 2010

(30) Foreign Application Priority Data

Jul. 15, 2008   (CN) .................. 2008 1 0302740

(51) Int. Cl.
    *E05D 3/10*       (2006.01)
(52) U.S. Cl. .............................. 16/367; 16/302; 16/340
(58) Field of Classification Search ............. 16/367, 16/366, 342, 371, 374, 302, 303, 330, 340, 16/282, 287, 294, 297, 298; 248/917, 919–923; 361/679.06, 679.07, 679.27; 455/575.3; 379/433.13
See application file for complete search history.

(56) References Cited

U.S. PATENT DOCUMENTS

| | | | | |
|---|---|---|---|---|
| 6,742,221 B2 * | 6/2004 | Lu et al. | ............ | 16/367 |
| 6,845,546 B1 * | 1/2005 | Lu et al. | ............ | 16/367 |
| 7,234,204 B2 * | 6/2007 | Liu et al. | ............ | 16/367 |
| 7,526,835 B2 * | 5/2009 | Chen | ............ | 16/367 |
| 7,530,144 B2 * | 5/2009 | Lu et al. | ............ | 16/342 |
| 7,568,261 B2 * | 8/2009 | Hsu et al. | ............ | 16/367 |
| 7,591,047 B2 * | 9/2009 | Chang et al. | ............ | 16/367 |
| 7,600,298 B2 * | 10/2009 | Chen et al. | ............ | 16/367 |
| 2007/0174997 A1 * | 8/2007 | Lu et al. | ............ | 16/367 |

* cited by examiner

*Primary Examiner*—William L. Miller
(74) *Attorney, Agent, or Firm*—Clifford O. Chi

(57) ABSTRACT

An exemplary dual-axis hinge mechanism includes a base seat, a first rotatable assembly and a second rotatable assembly. The first rotatable assembly includes a rotary member rotatably assembled in the base seat, a steady member and an elastic member non-rotatably received in the base seat, and a fastening member. The rotary member includes a rotational shaft configured for extending through the steady member, the elastic member, the base seat, and then engages with the fastening member. Each of the rotary member and the steady member defines an engaging surface. The engaging surfaces movably engage with each other. The fastening member is rotatable along the rotational shaft for adjusting an external force for rotating the rotary member. The second rotatable assembly includes a pivotal shaft fixed to the rotary member, and a bracket pivotally assembled on the pivotal shaft.

12 Claims, 6 Drawing Sheets

DUAL-AXIS HINGE MECHANISM

BACKGROUND

1. Technical Field

The present disclosure generally to hinge mechanisms and, more particularly, to a dual-axis hinge mechanism typically used for an electronic device.

2. Description of Related Art

An electronic device such as a mobile phone, a notebook computer, or a PDA (personal digital assistant), generally has a main body and a display cover. In general, the display cover is connected to the main body via a dual-axis hinge mechanism to realize rotating or folding-over functions, so as to facilitate adjustment of the position of the display cover relative to the user.

A typical dual-axis hinge mechanism includes a base seat, a first rotatable assembly, and a second rotatable assembly. The second rotatable assembly is pivotally connected to the base seat. The first rotatable assembly includes a pivotal shaft, a steady member, a rotary member, and an elastic member. The pivotal shaft is passed through the base seat, the steady member, and the rotary member. The base seat and the rotary member are rotatable relative to the pivotal shaft, and the steady member is non-rotatable relative to the pivotal shaft. The elastic member is configured for providing an axial force along the pivotal shaft such that the rotary member and the steady member abut each other. One of the rotary member and the steady member forms a protrusion, and the other one of rotary member and the steady member defines a recess for engaging with the protrusion. When an external force is applied to rotate the base seat and the rotary member around the pivotal shaft, the protrusion slides out of the recess, thus the base seat can be easily rotated to a desired position. Then the elastic force created by the elastic member in compressed state enable the rotary member and the steady member tightly contact each other, so that the base seat can be retained in the desired position by friction.

Because different electronic devices have a variety of display covers with different sizes and weights, different external forces are needed for rotating the display covers relative to the main bodies. However, while the typical dual-axis hinge mechanism may be used in different electronic devices, the external force for rotating the base seat is not adjustable, so the typical dual-axis hinge mechanism cannot meet different requirements. Thus the typical dual-axis hinge mechanism is inconvenient to use.

What is needed, therefore, is a new dual-axis hinge mechanism that overcomes the above mentioned disadvantages.

SUMMARY

A dual-axis hinge mechanism includes a base seat, a first rotatable assembly and a second rotatable assembly. The first rotatable assembly includes a rotary member rotatably assembled in the base seat, a steady member and an elastic member non-rotatably received in the base seat, and a fastening member. The rotary member includes a rotational shaft configured for extending through the steady member, the elastic member, the base seat, and then engages with the fastening member. Each of the rotary member and the steady member defines an engaging surface. The engaging surfaces movably engage with each other. One of the engaging surfaces forms a peak, and the other one of the engaging surfaces defines a valley corresponding to the peak. The fastening member is rotatable along the rotational shaft for adjusting an external force for rotating the rotary member. The second rotatable assembly includes a pivotal shaft fixed to the rotary member, and a bracket pivotally assembled on the pivotal shaft.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present dual-axis hinge mechanism. Moreover, in the drawings, like reference numerals designate corresponding parts throughout the several views.

DETAILED DESCRIPTION OF THE EMBODIMENTS

The present dual-axis hinge mechanism can be used in electronic devices such as notebook computers, PDAs, or mobile phones. Hereinafter, for the purposes of conveniently describing an exemplary dual-axis hinge mechanism, an embodiment of the dual-axis hinge mechanism as used in a notebook computer is described and illustrated.

Figure 1:
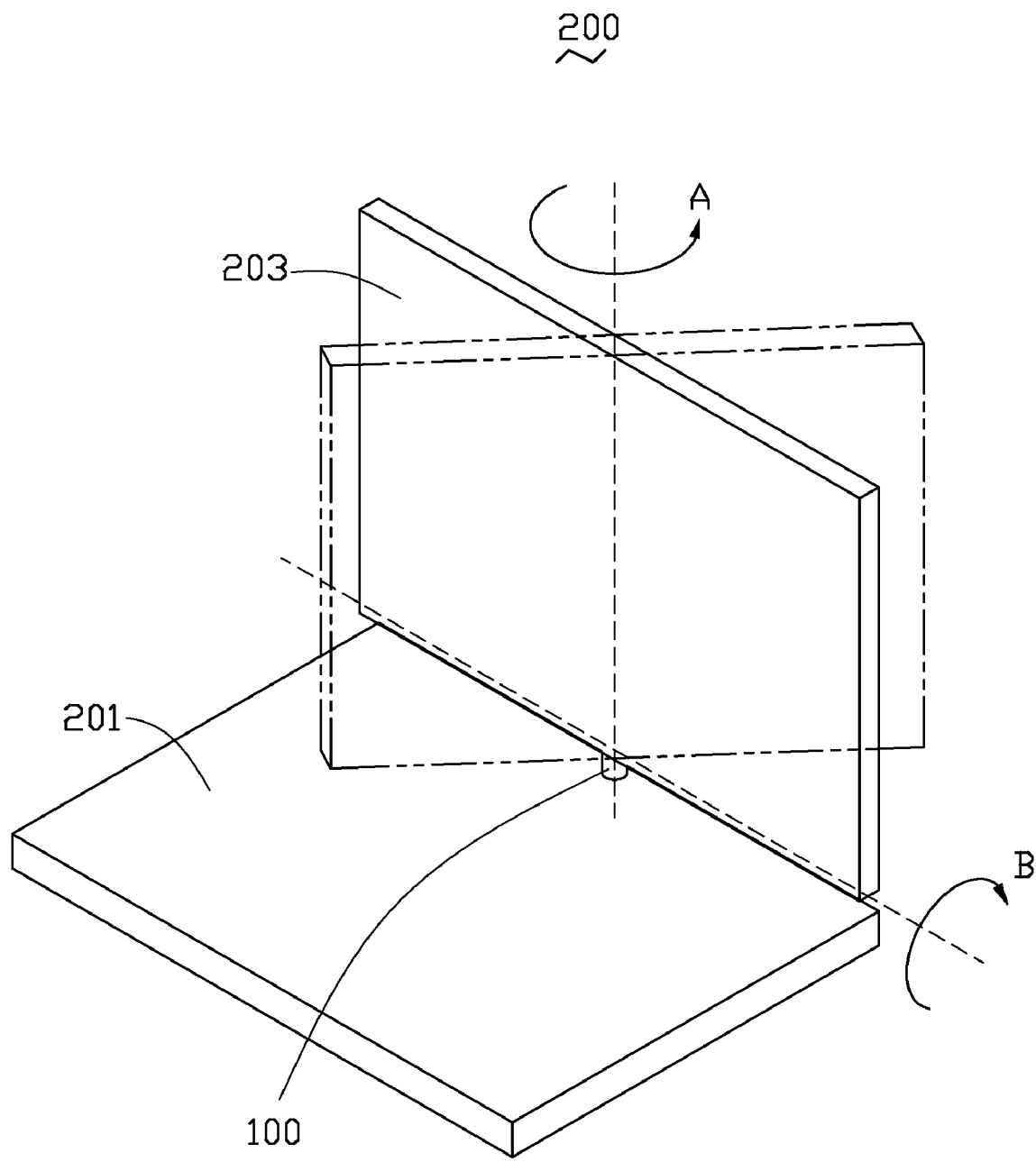
FIG. 1 is a schematic view of a notebook computer with a dual-axis hinge mechanism of one embodiment of the present disclosure.

Referring to FIG. 1, a notebook computer 200 with a dual-axis hinge mechanism 100 is shown. The notebook computer 200 includes a main body 201 and a display cover 203 pivotally connected to the main body 201 via the dual-axis hinge mechanism 100.

Figure 2:
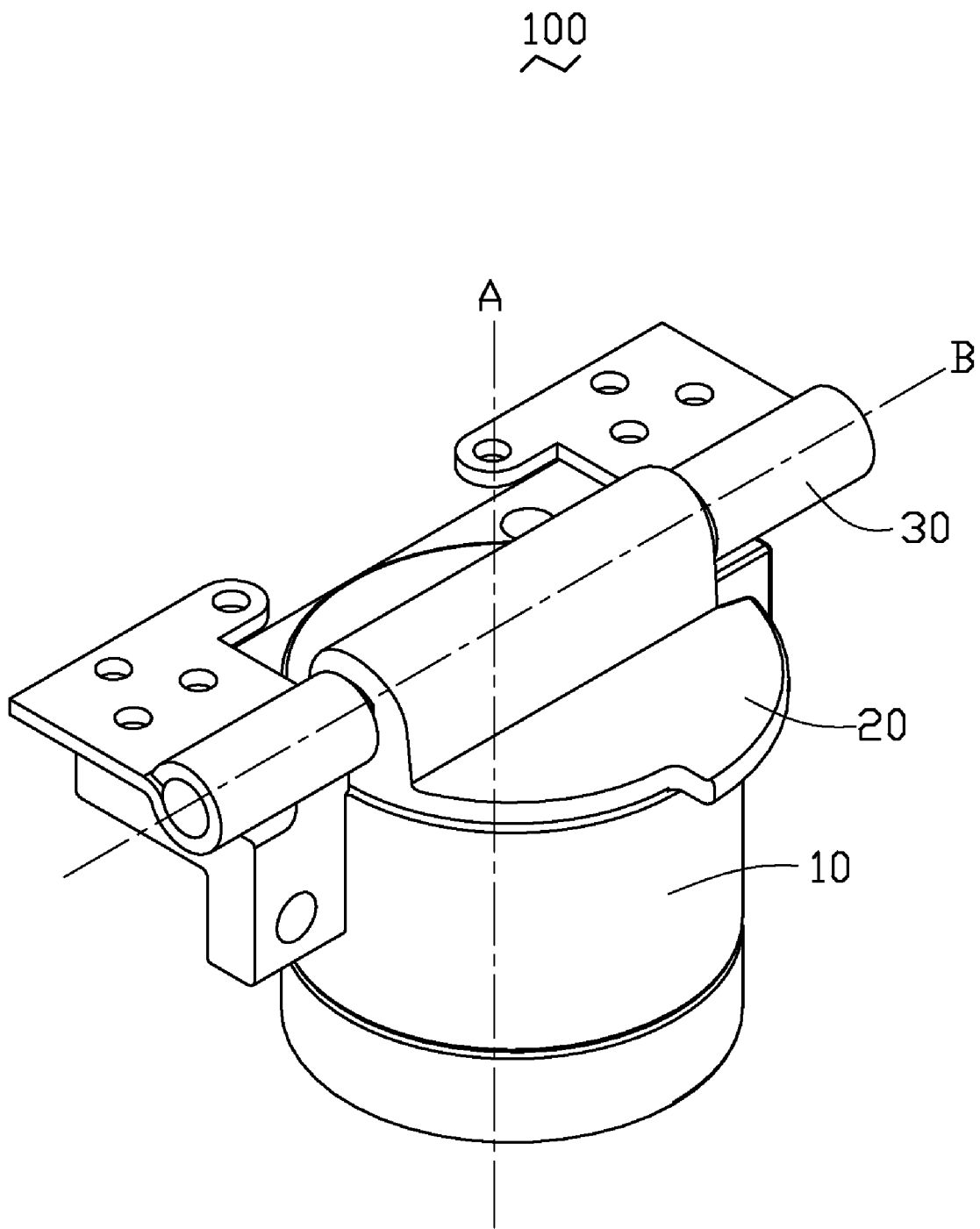
FIG. 2 is an assembled view of the dual-axis hinge mechanism in FIG. 1.

Referring to FIG. 2, the dual-axis hinge mechanism 100 includes a base seat 10, a first rotatable assembly 20 pivotally assembled in the base seat 10, and a second rotatable assembly 30 pivotally assembled with the first rotatable assembly 20. The base seat 10 may be fixed to the main body 201, and the second rotatable assembly 30 may be fixed to the display cover 203. Thus, the display cover 203 can be rotated around an axis A relative to the main body 201 via the first rotatable assembly 20, and can also be rotated around the axis B relative to the main body 201 via the second rotatable assembly 30.

Figure 3:
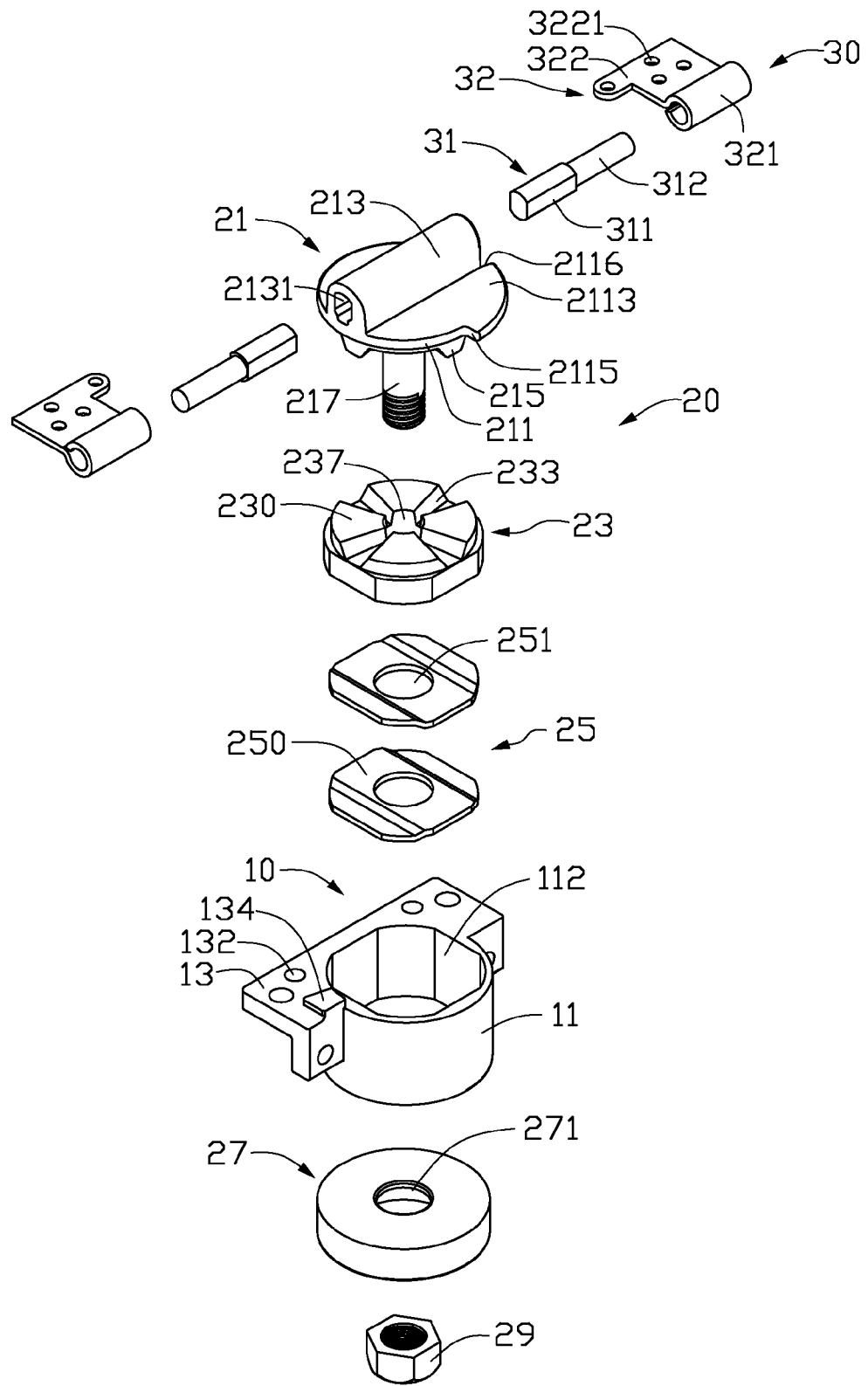
FIG. 3 is an exploded, isometric view of the dual-axis hinge mechanism in FIG. 2.
Figure 4:
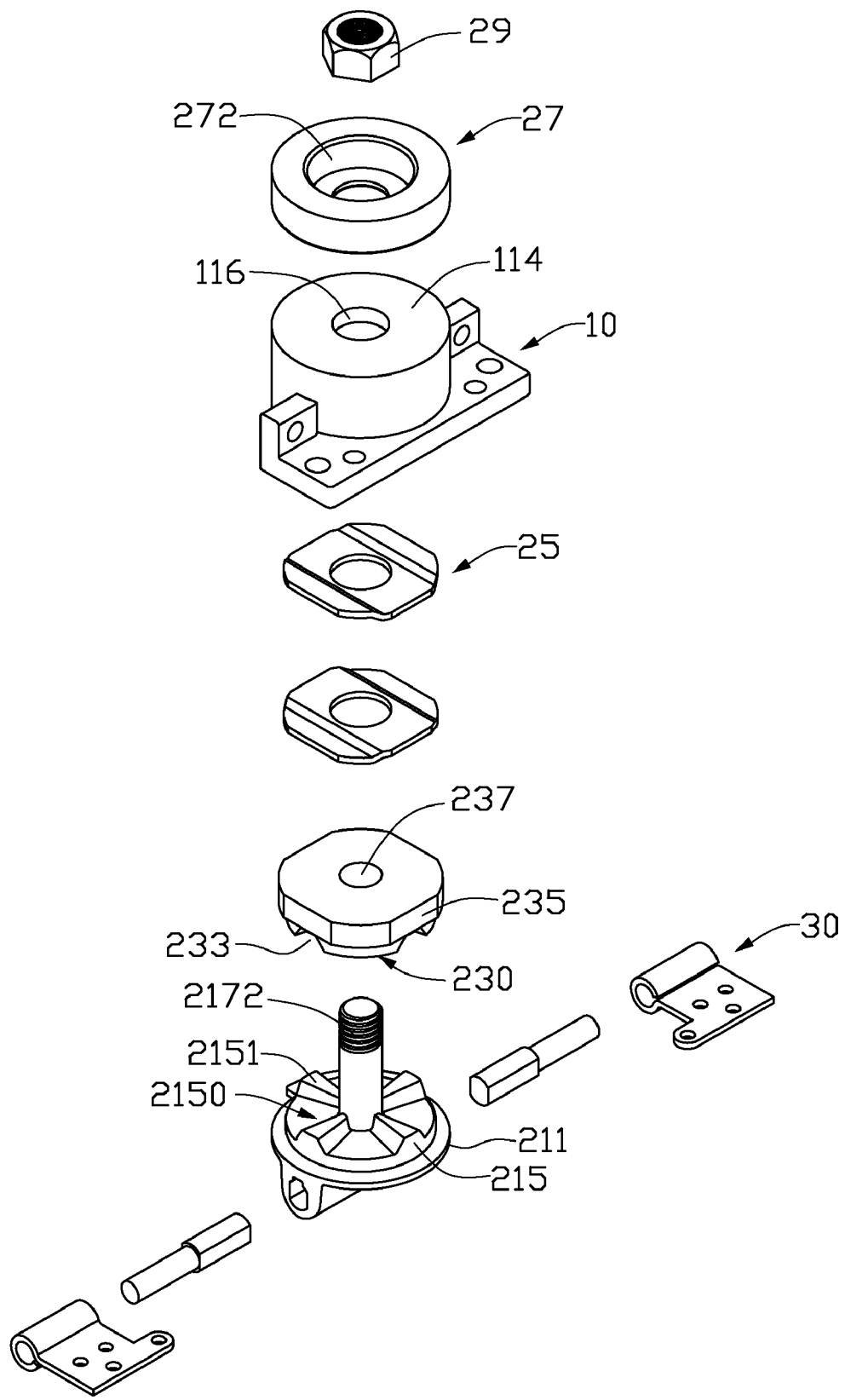
FIG. 4 is similar to FIG. 3, but viewed from another direction.

Referring to FIGS. 3 and 4, the base seat 10 includes a housing 11 and a mounting portion 13 extending from a side of an outer sidewall of the housing 11. The housing 11 is substantially barrel-shaped, and the housing 11 defines a generally polygonal cavity 112. In a preferred embodiment, the cavity 112 is substantially square shaped with rounded corners. The housing 11 includes a bottom end 114, and a through hole 116 defined in the bottom end 114 communicating with the cavity 112. The mounting portion 13 is substantially L-shaped. A plurality of mounting holes 132 is defined in the mounting portion 13 for fixing the mounting portion 13 on the main body 201 of the notebook computer 200. The mounting portion 13 includes a stopper portion 134 formed on a top surface of the mounting portion 13.

The base seat 10 may be manufactured by a lightweight material such as casting magnesium alloy or aluminum alloy. The housing 11 and the mounting portion 13 may be integrally formed together or formed separately, and then fixed together such as by jointing, locking, or screwing.

The first rotatable assembly 20 includes a rotary member 21, a steady member 23, an elastic member 25, a friction washer 27, and a fastening member 29.

The rotary member 21 includes a support board 211, an extending portion 213 formed on the first surface of the support board 211, a cam portion 215 formed on the second surface of the support board 211, and a rotational shaft 217 extending perpendicularly from the second surface of the support board 211.

The support board 211 is substantially disk-shaped. A portion of the periphery of the support board 211 extends outside to form a limiting protrusion 2113. The limiting protrusion 2113 includes two limiting surfaces 2115, 2116. The angle defined by the two limiting surfaces 2115, 2116 is about 90 degrees.

The extending portion 213 is substantially an elongated arc-shaped protrusion. The extending portion 213 defines a non-circular key hole 2131 extending through the extending portion 213 along the elongated direction thereof.

The cam portion 215 is substantially cylindrical. An outer diameter of the cam portion 215 is smaller than an outer diameter of the support board 211. The cam portion 215 has a first engaging surface 2150 opposite to the support board 211, and a plurality of peaks 2151 is evenly formed on the first engaging surfaces 2150. In the illustrated embodiment, a radial angle between adjacent peaks 2151 is about 90 degrees and two adjacent peaks 2151 are adjoined to the two limiting surfaces 2115, 2116 respectively.

The rotational shaft 217 is substantially cylindrical and has a threaded screw portion 2172 at the end of the rotational shaft 217.

The steady member 23 is substantially the same shape as the cavity 112 of the base seat 10. In the illustrated embodiment, the steady member 23 is substantially square shaped with rounded corners, so it can be non-rotatably received in the cavity 112. The steady member 23 defines a round hole 237 therein, and has a second engaging surface 230 for engaging with the first engaging surface 2150 of the rotary member 21. In the illustrated embodiment, the steady member 23 defines four valleys 233 in the second engaging surface 230 corresponding to the four peaks 2151 of the rotary member 21. In alternative embodiments, the peaks 2151 can be formed on the steady member 23, and the valleys 233 can be defined in the rotary member 21. In addition, the number of peaks 2151 and corresponding number of valleys 233 may be any desired number, such as one, two, three, five, or more.

At least one of the rotary member 21 and the steady member 23 is made of wear resistance materials, and may be manufactured by powder metallurgy method so that the rotary member or the steady member has properties of good wear resistance, high strength, and lower friction noise during a rotating process.

In the illustrated embodiment, the elastic member 25 includes two elastic pieces 250 configured to be non-rotatably received in the cavity 112 of the base seat 10. Each elastic piece 250 defines a circular hole 251 in a center thereof. In alternative embodiments, the number of the elastic pieces 250 may be any desired number, such as one, three, four, or more. The elastic member 25 may be springs, spring washers, elastic rubber rings, or cylinders.

The friction washer 27 is substantially cylindrical, with an outer diameter substantially the same as an outer diameter of the housing 11. The friction washer 27 defines a circular hole 271 in the center thereof. The friction washer 27 also defines a recessed portion 272 in a surface for receiving the fastening member 29. The fastening member 29 may be a screw nut engagable with the screw portion 2172 of the rotational shaft 217. In this embodiment, the friction washer 27 is made of polyoxymethylene with a lower friction coefficient than general plastic materials.

The second rotatable assembly 30 includes two pivotal shafts 31 and two brackets 32. The pivotal shaft 31 includes a first shaft portion 311 and a second shaft portion 312. The first shaft portion 311 has a cross-section with substantially the same shape as the key hole 2131 of the rotary member 21. The second shaft portion 312 may be cylindrical in shape. Each bracket 32 includes a sleeve portion 321 and a mounting portion 322. A plurality of mounting holes 3221 is defined in the mounting portion 322 for fixing the mounting portion 322 on the display cover 203 of the notebook computer 200.

In assembly of the dual-axis hinge mechanism 100, the elastic member 25 and the steady member 23 are non-rotatably received in the cavity 112 of the base seat 10. The rotational shaft 217 of the rotary member 21 is passed through the round hole 237 of the steady member 23, the circular hole 251 of the elastic member 25, the cavity 112, the through hole 116 of the base seat 10, and the circular hole 271 of the friction washer 27. The first engaging surface 2150 of the rotary member 21 engages with the second engaging surface 230 of the steady member 23. The fastening member 29 is screwed on the screw portion 2172 of the rotational shaft 217 to retain the friction washer 27, the base seat 10, the elastic member 25, and the steady member 23 on the rotational shaft 217 of the rotary member 21. The first shaft portion 311 of the pivotal shaft 31 is non-rotatably inserted into the key hole 2131 of the rotary member 21. The sleeve portion 321 of the bracket 32 is pivotally sleeved on the second shaft portion 312 of the pivotal shaft 31. Thus, the bracket 32 is rotatable relative to the rotary member 21. The rotary member 21 is rotatable relative to the steady member 23.

Figure 5:
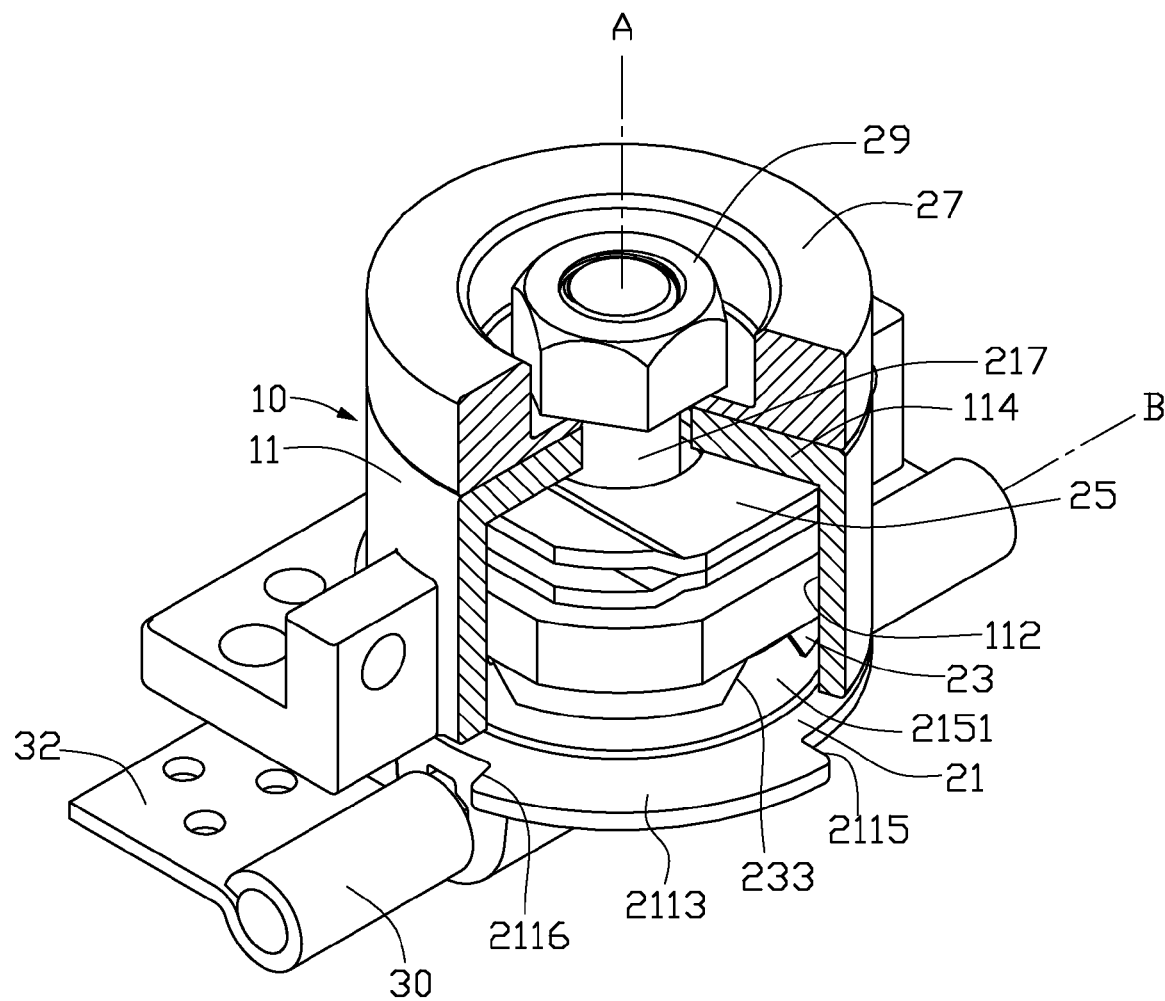
FIG. 5 is a partially cross-sectional view of the dual-axis hinge mechanism in FIG. 2, showing a rotary member non-rotated relative to a steady member.

Referring to FIG. 5, when the display cover 203 is retained in an initial position relative to the main body 201, the rotary member 21 is non-rotated relative to the steady member 23, the peaks 2151 of the rotary member 21 are received in the corresponding valleys 233 of the steady member 23, and the elastic member 25 is decompressed.

Figure 6:
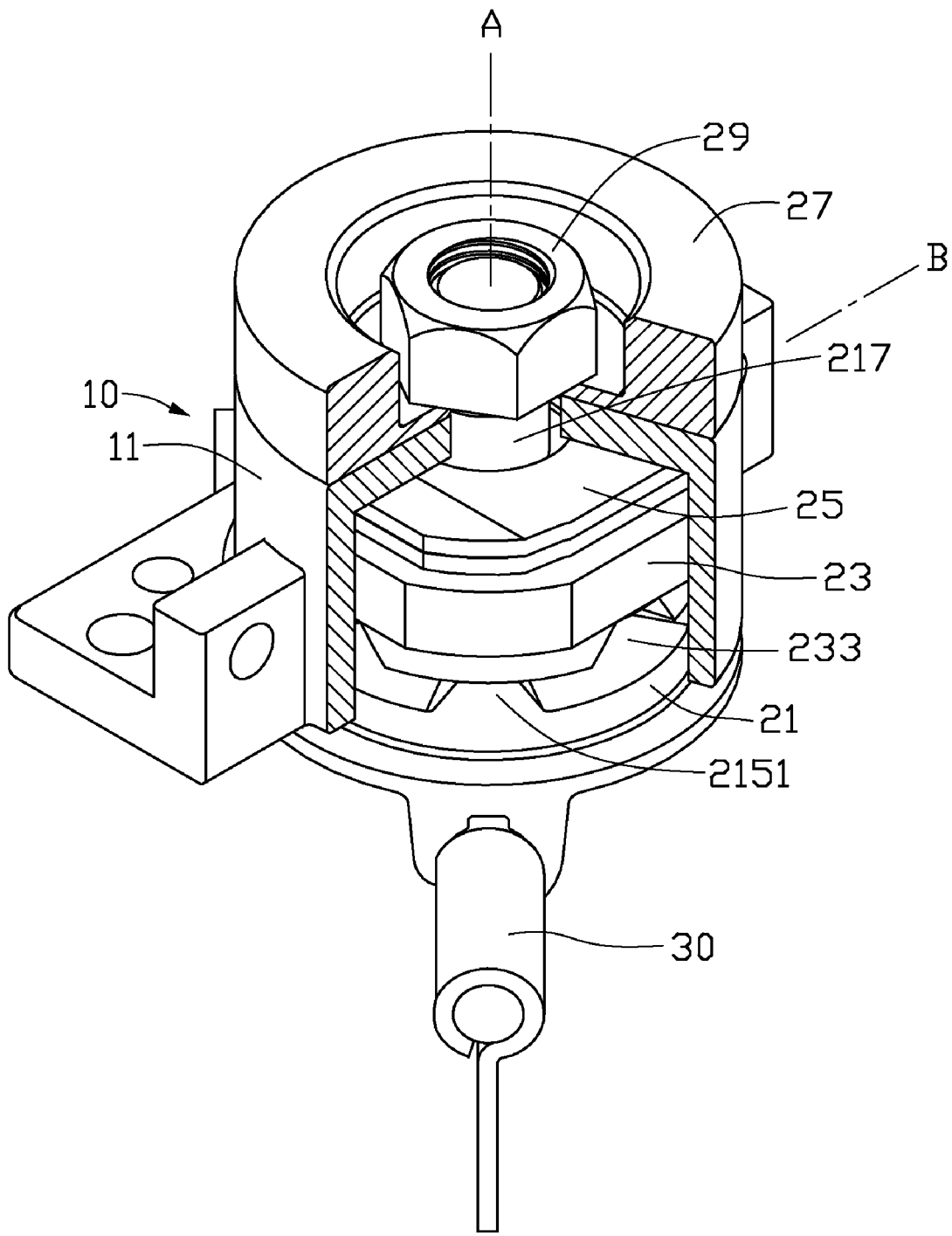
FIG. 6 is a partially cross-sectional view of the dual-axis hinge mechanism in FIG. 2, showing the rotary member rotated an angle of 45 degrees relative to the steady member.

Referring to FIG. 6, an external force is applied to rotate the display cover 203 relative to the main body 201. As the rotary member 21 is rotated around a rotational axis A relative to the steady member 23, the peaks 2151 slide out of the valleys 233, and the elastic member 25 reaches a compressed state due to the steady member 23. Since the rotary member 21 has been rotated to a desired position relative to the steady member 23, an elastic force, created by the elastic member 25 in the compressed state in a direction along the rotational axis A, pushes the steady member 23 to tightly contact the rotary member 21. Thus, the display cover 203 can be retained in the desired position relative to the main body 201 because of the frictional force generated between the steady member 23 and the rotary member 21.

When the display cover 203 reaches any one of the predetermined engaging positions, the peaks 2151 are received in the corresponding valleys 233, the elastic member 25 is decompressed, and the display cover 203 stably remains in one of the predetermined engaging positions. When the rotary member 21 rotates around the rotational axis A from one of the predetermined engaging positions, the peaks 2151 slide out of the valleys 233, the elastic member 25 becomes compressed, and the display cover 203 is retained when rotated to a desired position, because of the elastic force created by the elastic member 25 in the compressed state. In the illustrated embodiment, from the initial position (shown in FIG. 5), when the rotary member 21 is rotated 90 degrees clockwise around the rotational axis A, the limiting surface 2115 of the limiting protrusion 2113 blocks the stopper portion 134 of the base seat 10, thereby preventing the rotary member 21 from rotating any further. When the rotary member 21 is rotated 180 degrees counterclockwise around the rotational axis A, the limiting surface 2116 of the limiting protrusion 2113 blocks the stopper portion 134 of the base seat 10, thereby preventing the rotary member 21 from rotating any further. Therefore, an angle range of the rotary member 21 is limited. In alternative embodiments, the angle defined by the two limiting surfaces 2115, 2116 can be adjusted to any desired limits.

When an external force is applied to either open or close the display cover 203 relative to the main body 201, the brackets 32 are rotated around the rotational axis B relative to the rotary member 21. Frictional forces created between the sleeve portions 321 of the brackets 32 and the second shaft portions 312 of the pivotal shafts 31 enable the display cover 203 to be retained in any desired position. In an alternative embodiment, any spring washers or friction washers may be included to sleeve on the second shaft portions 312, between the first shaft portions 311 and the brackets 32. The spring washers would provide axial forces in directions along the rotational axis B to create frictional forces between the friction washers and the brackets 32, thus enabling the display cover to be stably retained in any desired portion.

The fastening member 29 is rotatable along the screw portion 2172 of the rotational shaft 217 to adjust the elastic force of the elastic member 25 between the bottom end 114 of the housing 11 and the steady member 23. When the elastic force is increased, the frictional force generated between the steady member 23 and the rotary member 21 is also increased. When the elastic force is decreased, the frictional force generated between the steady member 23 and the rotary member 21 is also decreased. Thus, the external force that overcomes the frictional force generated between the steady member 23 and the rotary member 21 for rotating the display cover is adjustable to meet different requirements of different electronic devices. Therefore, the dual-axis hinge mechanism 100 is convenient to use.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A dual-axis hinge mechanism, comprising:
   a base seat;
   a first rotatable assembly comprising:
      a steady member non-rotatably received in the base seat;
      an elastic member non-rotatably received in the base seat;
      a rotary member rotatably assembled in the base seat, and comprising a rotational shaft having a threaded screw portion;
      a fastening member rotatable along the rotational shaft by threaded cooperation to adjust an external force for rotating the rotary member; and
   a second rotatable assembly comprising a pivotal shaft fixed to the rotary member, and a bracket pivotally assembled on the pivotal shaft;
   wherein the threaded screw portion of the rotational shaft extends through the steady member, the elastic member, the base seat, and then engaging with the fastening member, each of the rotary member and each of the steady member comprises an engaging surface, the engaging surfaces movably engage with each other, and one of the engaging surfaces forms at least one peak, and the other of the engaging surfaces defines at least one valley corresponding to the at least one peak.

2. The dual-axis hinge mechanism of claim 1, wherein the base seat comprises a substantially barrel shaped housing; a generally polygonal cavity is defined in the housing; the steady member is prism shaped, and a cross-section of the steady member is substantially the same shape as the cavity of the base seat; the elastic member comprises a plurality of elastic pieces configured to be non-rotatably received in the cavity of the base seat.

3. The dual-axis hinge mechanism of claim 1, wherein the base seat comprises a stopper portion; the rotary member comprises a limiting protrusion that blocks the stopper portion thereby restricting further rotation of the rotary member in a clockwise direction and in a counterclockwise direction.

4. The dual-axis hinge mechanism of claim 3, wherein the base seat comprises a mounting portion; the stopper portion is defined on a top surface of the mounting portion; the rotary member comprises a support board; a limiting protrusion extends from the periphery of the support board, and comprises two limiting surfaces, the angle defined by the two limiting surfaces is 90 degrees.

5. The dual-axis hinge mechanism of claim 4, wherein the rotary member comprises an extending portion extending from the first surface of the support board; a non-circular key hole is defined in the extending portion; the pivotal shaft of the second rotatable assembly comprises a first shaft portion and a cylindrical second shaft portion, a cross-section of the first shaft portion is substantially the same shape as the key hole; the first shaft portion of the pivotal shaft is configured to be non-rotatably inserted into the key hole of the extending portion.

6. The dual-axis hinge mechanism of claim 5, wherein the bracket comprises a sleeve portion configured to be sleeved on the second shaft portion of the pivotal shaft.

7. The dual-axis hinge mechanism of claim 4, wherein the rotary member comprises a cam portion formed on the second surface of the support board, the cam portion comprises a first engaging surface and forms four evenly spaced peaks at the first engaging surface; the steady member comprises a second engaging surface for engaging with the first engaging surface of the rotary member, and defines four valleys in the second engaging surface corresponding to the four peaks of the rotary member.

8. The dual-axis hinge mechanism of claim 4, wherein the rotational shaft is extending perpendicularly from the support board of the rotary member; the rotational shaft is substantially cylindrical.

9. The dual-axis hinge mechanism of claim 1, wherein the first rotatable assembly comprises a friction washer positioned between the base seat and the fastening member; a recessed portion for receiving the fastening member is defined in a surface of the friction washer.

10. The dual-axis hinge mechanism of claim 9, wherein the friction washer is made of polyoxymethylene with a lower friction coefficient than general plastic materials.

11. The dual-axis hinge mechanism of claim 1, wherein the base seat is manufactured by casting magnesium alloy or aluminum alloy.

12. The dual-axis hinge mechanism of claim 1, wherein one of the rotary member and the steady member is made of wear resistance materials, and manufactured by powder metallurgy method.

* * * * *